(12) United States Patent
Takeda et al.

(10) Patent No.: US 12,030,482 B2
(45) Date of Patent: Jul. 9, 2024

(54) VEHICLE CONTROL SYSTEM

(71) Applicant: TOYOTA JIDOSHA KABUSHIKI KAISHA, Toyota (JP)

(72) Inventors: Tomohiko Takeda, Nisshin (JP); Naoki Yabusaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 17/843,312

(22) Filed: Jun. 17, 2022

(65) Prior Publication Data
US 2022/0410871 A1 Dec. 29, 2022

(30) Foreign Application Priority Data

Jun. 28, 2021 (JP) ................. 2021-107035

(51) Int. Cl.
*B60W 30/045* (2012.01)
*B60W 30/02* (2012.01)
*B60W 30/18* (2012.01)

(52) U.S. Cl.
CPC ........ *B60W 30/045* (2013.01); *B60W 30/025* (2013.01); *B60W 30/18109* (2013.01); *B60W 2510/0638* (2013.01); *B60W 2510/18* (2013.01); *B60W 2510/20* (2013.01)

(58) Field of Classification Search
CPC ............. B60W 30/045; B60W 30/025; B60W 30/18109; B60W 2510/0638; B60W 2510/18; B60W 2510/20
See application file for complete search history.

(56) References Cited

U.S. PATENT DOCUMENTS

2010/0198441 A1  8/2010  Mizuno et al.

FOREIGN PATENT DOCUMENTS

JP  2009-035081 A  2/2009

*Primary Examiner* — Mathew Franklin Gordon
(74) *Attorney, Agent, or Firm* — Sughrue Mion, PLLC

(57) ABSTRACT

A control device executes caster angle change control for controlling a driving force applying device or each of the driving force applying device and a braking force applying device to reduce a caster angle of a steered tire-wheel assembly when a steering request is received in a stopped state or in a creeping state without exceeding a predetermined vehicle speed at a point starting from the stopped state. In the caster angle change control, the control device applies, to one tire-wheel assembly out of a front tire-wheel assembly and a rear tire-wheel assembly, a driving force in a direction toward the other tire-wheel assembly and applies, to the other tire-wheel assembly, a braking force or a driving force in a direction toward the one tire-wheel assembly to achieve the stopped state or the creeping state in response to a request for acceleration or deceleration.

7 Claims, 6 Drawing Sheets

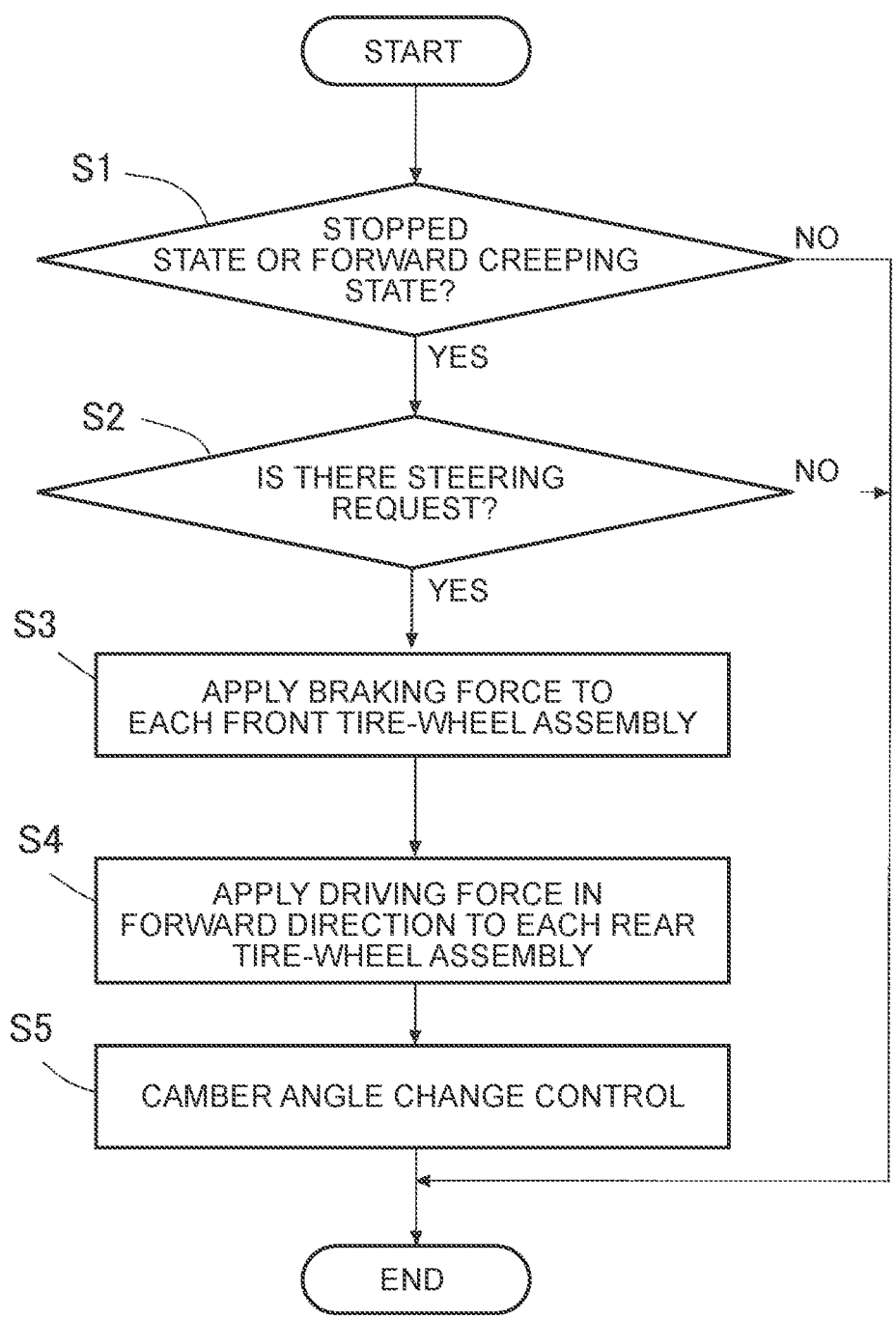

VEHICLE CONTROL SYSTEM

CROSS-REFERENCE TO RELATED APPLICATION

This application claims priority to Japanese Patent Application No. 2021-107035 filed on Jun. 28, 2021, incorporated herein by reference in its entirety.

BACKGROUND

1. Technical Field

The present disclosure relates to a vehicle control system.

2. Description of Related Art

For example, Japanese Unexamined Patent Application Publication No. 2009-035081 (JP 2009-035081 A) describes a technology relating to an alignment adjusting device for adjusting alignment of tire-wheel assemblies. In this device, the alignment of the tire-wheel assemblies is adjusted to, for example, reduce traveling resistance of a vehicle. According to this device, a camber angle can also be adjusted.

SUMMARY

When so-called stationary steering is performed to change steered angles of steered tire-wheel assemblies while the vehicle is stopped, a great force is required due to a frictional force between each tire and the ground surface. For example, in a steer-by-wire steering system, an actuator needs to output a great force during the stationary steering, thereby applying a large load on the actuator. Similarly to the stationary steering, a large load is applied in a steering operation when the vehicle is traveling at a creeping speed (ultra-low speed), for example, during a parking operation. Even in, for example, a power steering system, a force required for operating a steering wheel or an assist force using an electric motor increases in a steering operation while the vehicle is stopped or traveling at a creeping speed. As described above, there is room for improvement in the related-art system from the viewpoint of reducing the load on the system for the change of the steered angles of the steered tire-wheel assemblies while the vehicle is stopped or traveling at a creeping speed. An object of the present disclosure is to provide a vehicle control system capable of reducing a force required for changing the steered angles of the steered tire-wheel assemblies while the vehicle is stopped or traveling at a creeping speed.

A vehicle control system of the present disclosure includes a driving force applying device configured to apply a driving force to at least one of a front tire-wheel assembly and a rear tire-wheel assembly, a braking force applying device configured to apply a braking force to each of the front tire-wheel assembly and the rear tire-wheel assembly, and a control device configured to control the driving force to be applied by the driving force applying device and the braking force to be applied by the braking force applying device. The control device is configured to execute caster angle change control for controlling the driving force applying device or each of the driving force applying device and the braking force applying device to reduce a caster angle of a steered tire-wheel assembly when a steering request is received in a stopped state in which a vehicle is stopped or in a creeping state in which the vehicle is traveling in a preset direction out of a forward direction and a rearward direction without exceeding a predetermined vehicle speed at a point starting from the stopped state. The control device is configured to, in the caster angle change control, apply, to one of the front tire-wheel assembly and the rear tire-wheel assembly, a driving force in a direction toward the other of the front tire-wheel assembly and the rear tire-wheel assembly and apply, to the other of the front tire-wheel assembly and the rear tire-wheel assembly, the braking force or a driving force in a direction toward the one of the front tire-wheel assembly and the rear tire-wheel assembly to achieve the stopped state or the creeping state in response to a request for acceleration or deceleration.

The caster angle is an angle between a kingpin axis and a line perpendicular to a road surface (vertical line) when the steered tire-wheel assembly is viewed from the side (in a lateral direction of the vehicle). The kingpin axis is inclined so that a lower part of the kingpin axis is located on a forward side of an upper part of the kingpin axis. As the caster angle decreases, a restoration torque for steering of the tire-wheel assembly generally decreases during traveling. When the caster angle decreases in the stopped state, a caster trail decreases and the resistance to a steering operation for the steered tire-wheel assembly decreases.

According to the present disclosure, the control device executes the caster angle change control when the steering request is received while the vehicle is in the stopped state or the creeping state. In the caster angle change control, the driving force in the direction toward the other tire-wheel assembly is applied to the one tire-wheel assembly, and the resistive force is applied to the other tire-wheel assembly. Therefore, a force (moment) such as an inertial force applied in deceleration during forward movement is applied to a vehicle body. In other words, a force such as a pitching moment in a forward rotation direction is applied to the vehicle body by the caster angle change control. When such a force is applied to the vehicle body, a forward force is structurally applied to upper parts defining an upper passing point of the kingpin axis, and an elastic member arranged on the upper parts (for example, a bush) is elastically deformed. Through the elastic deformation, the upper parts and the upper passing point of the kingpin axis move forward relative to a lower passing point of the kingpin axis.

According to the present disclosure, the upper parts are moved forward relative to lower parts by elastically deforming the elastic member on the upper parts as intended to raise the kingpin axis when the steered tire-wheel assembly is viewed from the side, thereby reducing the caster angle. As the caster angle decreases, the force required to steer the steered tire-wheel assembly decreases. According to the present disclosure, it is possible to reduce the force required for changing the steered angles of the steered tire-wheel assemblies while the vehicle is stopped or traveling at the creeping speed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10 is a flowchart illustrating a control example of the present embodiment.

DETAILED DESCRIPTION OF EMBODIMENTS

Figure 1:
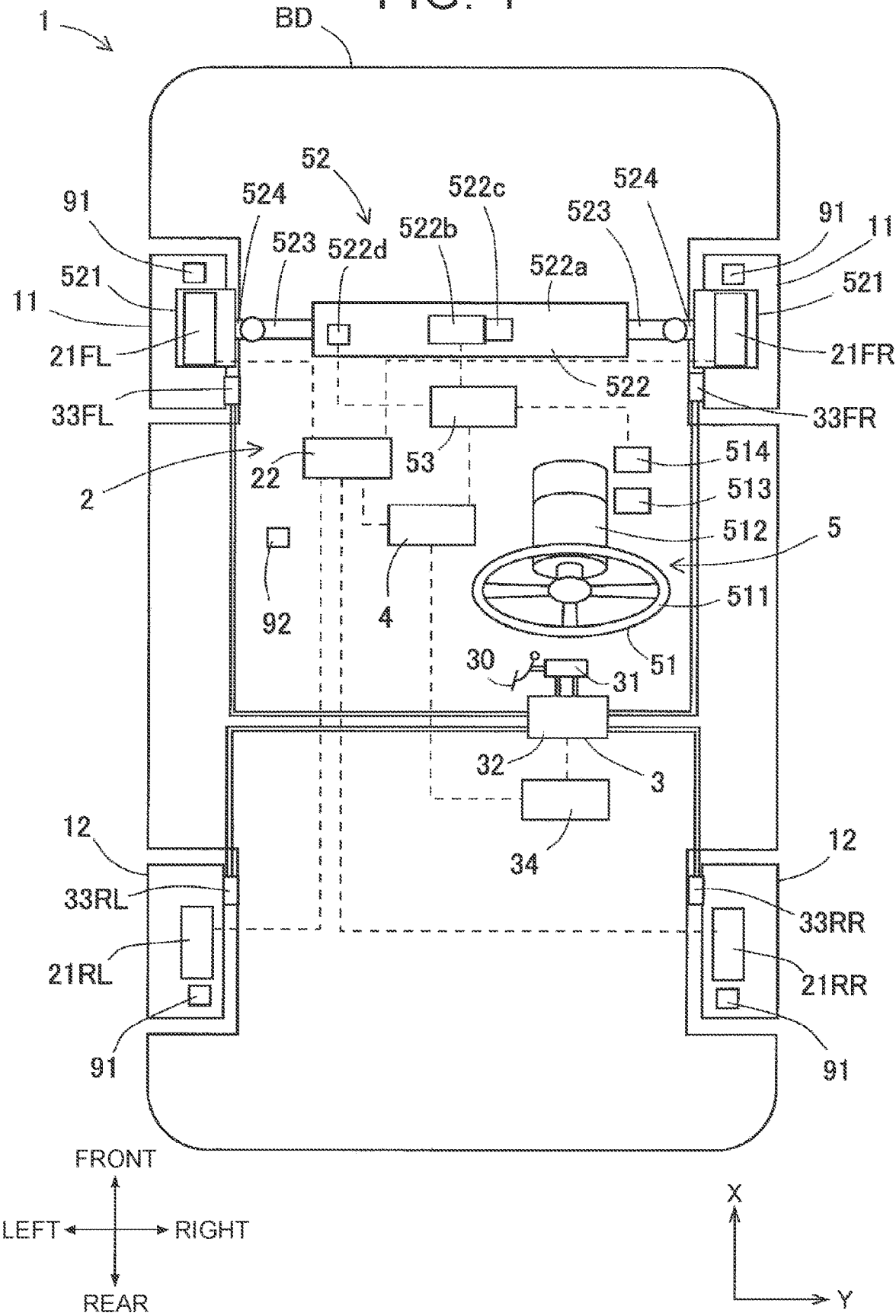
FIG. 1 is a schematic diagram illustrating an overall structure of a vehicle including a vehicle control system of an embodiment.
Figure 2:
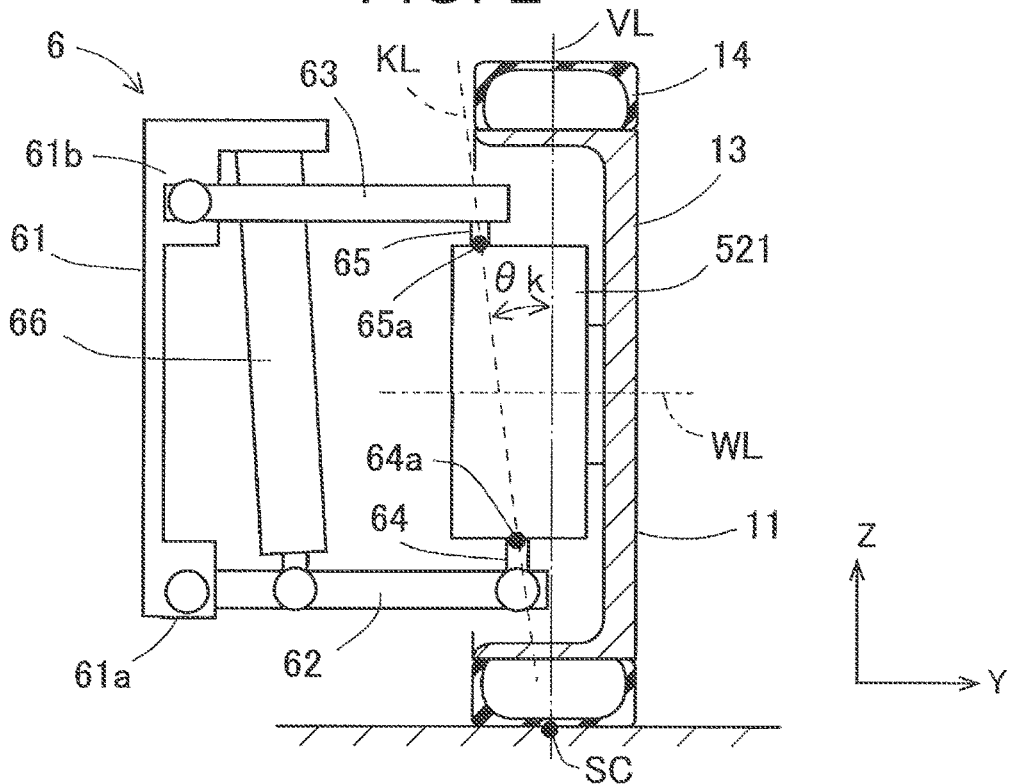
FIG. 2 is a schematic diagram illustrating a structure around a front tire-wheel assembly in the present embodiment as viewed from the front of the vehicle.

Hereinafter, an embodiment of the present disclosure will be described with reference to the drawings. As illustrated in FIGS. 1 and 2, a vehicle control system 1 of the present embodiment includes a driving force applying device 2 that applies a driving force to at least one of front tire-wheel assemblies 11 and rear tire-wheel assemblies 12, a braking force applying device 3 that applies a braking force to the front tire-wheel assemblies 11 and the rear tire-wheel assemblies 12, a control device 4 that controls the driving force to be applied by the driving force applying device 2 and the braking force to be applied by the braking force applying device 3, a steering system 5, and suspension devices 6. The front tire-wheel assemblies 11 include a right front tire-wheel assembly and a left front tire-wheel assembly. The rear tire-wheel assemblies 12 include a right rear tire-wheel assembly and a left rear tire-wheel assembly. The front tire-wheel assemblies 11 and the rear tire-wheel assemblies 12 are hereinafter referred to collectively as "tire-wheel assemblies 11 and 12" as well. Communication in the vehicle is performed via a car area network or a controllable area network (CAN). In FIG. 1, illustration of some communication lines is omitted.

The driving force applying device 2 can independently apply driving forces to the front tire-wheel assemblies 11 and the rear tire-wheel assemblies 12. The driving force applying device 2 includes in-wheel motors 21FL, 21FR, 21RL, and 21RR (hereinafter referred to collectively as "in-wheel motors 21" as well) serving as driving devices provided on the tire-wheel assemblies 11 and 12, and a drive electronic control unit (ECU) 22 that controls the in-wheel motors 21. Each of the tire-wheel assemblies 11 and 12 is driven to rotate by the in-wheel motor 21 arranged inside a wheel. Description of the specific structure of the in-wheel motor 21 is omitted because a known structure can be applied.

The drive ECU 22 is an electronic control unit including a central processing unit (CPU), a memory, and the like, and is communicably connected to each in-wheel motor 21 via the CAN. For example, the drive ECU 22 controls each in-wheel motor 21 based on an accelerator operation amount or in response to an acceleration/deceleration request (for example, a requested acceleration) from another ECU. The drive ECU 22 calculates a current vehicle speed based on, for example, tire-wheel assembly speed information received from tire-wheel assembly speed sensors 91. An acceleration sensor 92 provided in the vehicle detects an acceleration in a fore-and-aft direction of the vehicle and transmits the acceleration to the drive ECU 22 or the like.

The braking force applying device 3 is a brake-by-wire braking system. The braking force applying device 3 can independently apply braking forces to the front tire-wheel assemblies 11 and the rear tire-wheel assemblies 12. The braking force applying device 3 includes a brake pedal 30 serving as a brake operating member, a master cylinder 31, a hydraulic pressure adjusting device 32, brake devices 33FL, 33FR, 33RL, and 33RR (hereinafter referred to collectively as "brake devices 33" as well), and a brake ECU 34. The master cylinder 31 outputs a brake fluid based on an amount of operation on the brake pedal 30.

The hydraulic pressure adjusting device 32 supplies the brake fluid to each brake device 33 in response to an instruction from the brake ECU 34. The hydraulic pressure adjusting device 32 is a so-called brake actuator such as an electronic stability control (ESC) actuator, including an electric motor, a pump, and a solenoid valve (not illustrated). The hydraulic pressure adjusting device 32 can independently adjust the braking forces to be applied by the brake devices 33 by increasing or reducing hydraulic pressures in wheel cylinders of the brake devices 33. The hydraulic pressure adjusting device 32 can adjust each braking force in response to an instruction from the brake ECU 34 regardless of whether the brake pedal 30 is operated. Examples of the brake device 33 include a disc brake device and a drum brake device.

The brake ECU 34 is an electronic control unit including a CPU, a memory, and the like, and is communicably connected to the hydraulic pressure adjusting device 32. For example, the brake ECU 34 controls the hydraulic pressure adjusting device 32 in response to a braking request based on an operation on the brake pedal 30 or a braking request from another ECU. The brake ECU 34 controls the hydraulic pressure adjusting device 32 based on detection results from various sensors such as the tire-wheel assembly speed sensors 91 provided on the tire-wheel assemblies 11 and 12, thereby executing, for example, anti-skid control (anti-lock braking system (ABS) control) or sideslip prevention control (ESC control).

The steering system 5 is a steer-by-wire steering system, and includes a steering operation device 51, a tire-wheel assembly steering device 52 for steering the pair of front tire-wheel assemblies 11, and a steering ECU 53. The steering operation device 51 may be a device that detects a driver's intention to steer based on a driver's operation. Specifically, the steering operation device 51 includes a steering wheel 511 serving as a steering operation member, a steering column 512, a reaction motor 513, and an operation angle sensor 514.

The steering column 512 rotatably holds the steering wheel 511 and is held by a vehicle body BD. The reaction motor 513 is a device that applies an operation reaction force to the steering wheel 511. The operation angle sensor 514 detects an angle of operation (operation angle) from a neutral position of the steering wheel 511 to the right or left. The neutral position is a straight-ahead position of the steering wheel 511.

The tire-wheel assembly steering device 52 changes the steered angles of the front tire-wheel assemblies 11 serving as the steered tire-wheel assemblies based on a detection result from the operation angle sensor 514 (in response to an instruction from the steering ECU 53). Specifically, the tire-wheel assembly steering device 52 includes a pair of steering knuckles 521 and a steering actuator 522. The steering knuckles 521 are members that are rotatably held by right and left suspension arms (not illustrated) and rotatably hold the corresponding front tire-wheel assemblies 11. The steering knuckle 521 also serves as a housing for an in-wheel motor unit including the in-wheel motor 21, a speed reducer, and the like. That is, the in-wheel motor 21 is arranged in the steering knuckle 521 serving as the housing.

The steering actuator 522 holds a steering rod 523 and moves the steering rod 523 rightward or leftward in response to an instruction from the steering ECU 53. Each end of the steering rod 523 is coupled to a knuckle arm (not illustrated) extending from the steering knuckle 521 via a link rod 524.

Specifically, the steering actuator 522 includes a housing 522a for holding the steering rod 523, and a steering motor 522b. The steering rod 523 in the housing 522a has a groove. The housing 522a rotatably holds a nut (not illustrated) that holds bearing balls (not illustrated) and meshes with the groove of the steering rod 523. That is, the steering actuator 522 includes a ball screw mechanism including the steering rod 523 and the nut. The steering motor 522b is attached to the housing 522a and rotates the nut via a transmission belt 522c.

The steering actuator 522 steers the front tire-wheel assemblies 11 by an angle corresponding to an amount of rotation of the nut, that is, an amount of rotation of the steering motor 522b. The steered angle of the front tire-wheel assembly 11 is proportional to an amount of rightward or leftward movement of the steering rod 523. The steering actuator 522 includes a steered amount sensor 522d that detects the amount of movement of the steering rod 523 corresponding to the steered angle of each front tire-wheel assembly 11 as a steered amount via a rack and pinion mechanism.

The steering ECU 53 is an electronic control unit including a CPU, a memory, and the like, and is communicably connected to the steering operation device 51 and the tire-wheel assembly steering device 52. The steering ECU 53 controls the steering system 5 by, for example, executing a predetermined program. It is assumed that basic control is control during a normal operation in which autonomous driving or the like is not performed. In the basic control, the steering ECU 53 sets a target steered amount based on a detection result (operation angle) from the operation angle sensor 514, and controls the rotation amount of the steering motor 522b so that a detection result (steered amount) from the steered amount sensor 522d reaches the target steered amount. The steering ECU 53 controls the reaction motor 513 to apply, to the steering wheel 511, an operation reaction force in a direction in which the steering wheel 511 returns to the neutral position in a magnitude corresponding to the detected operation angle.

Figure 3:
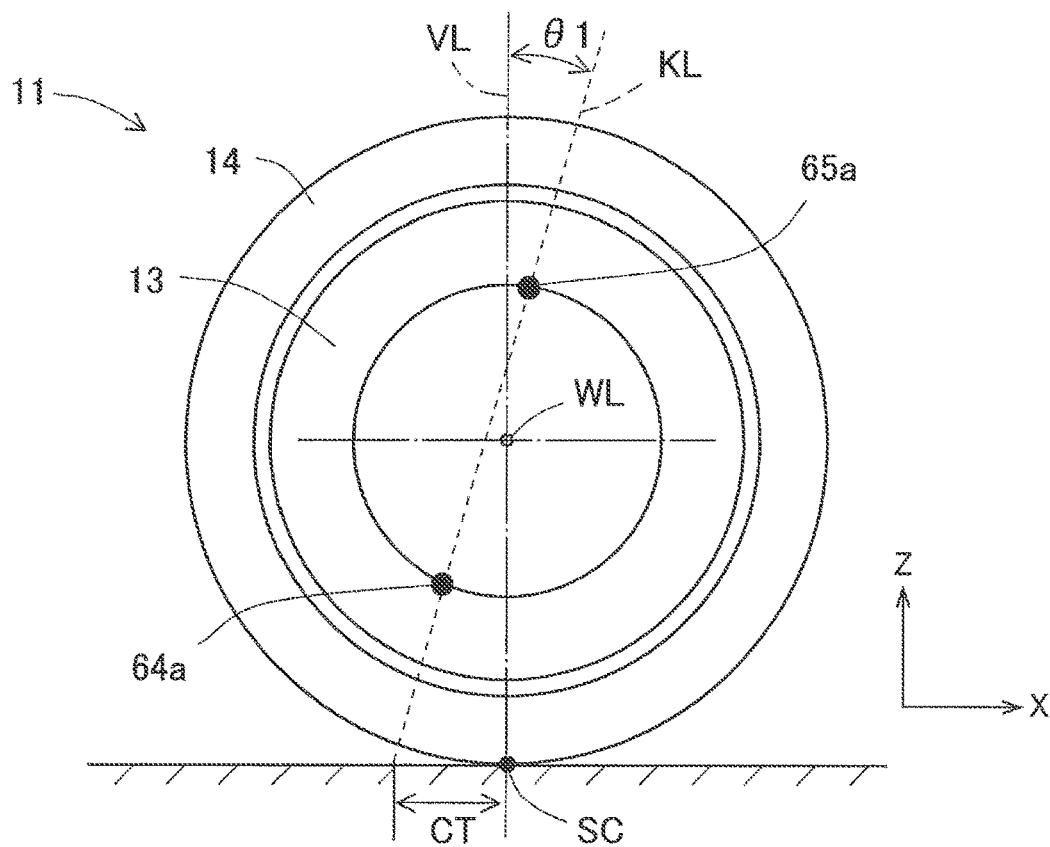
FIG. 3 is a schematic diagram illustrating a caster angle in the structure of the present embodiment.

As illustrated in FIG. 2, the suspension device 6 is a double wishbone suspension device. In the description, a rotation axis of the front tire-wheel assembly 11 (left front tire-wheel assembly in FIG. 2) is defined as a tire-wheel assembly axis WL, and a line passing through a contact patch center SC that is the center of a contact patch of the front tire-wheel assembly 11 and being perpendicular to the contact patch is defined as a vertical line VL. In FIGS. 2 and 3, the tire-wheel assembly axis WL is assumed to be parallel to a road surface. A tire-wheel assembly axis direction that is an extending direction of the tire-wheel assembly axis WL in FIGS. 2 and 3 may be referred to as "Y direction". A vertical direction may be referred to as "Z direction". A horizontal direction perpendicular to the tire-wheel assembly axis direction may be referred to as "X direction". When the front tire-wheel assembly 11 is not steered, the X direction agrees with the fore-and-aft direction of the vehicle. The front tire-wheel assembly 11 includes a wheel 13 and a tire 14.

The suspension device 6 includes a base plate 61, the steering knuckle 521, a lower arm 62, an upper arm 63, and a spring absorber assembly 66. The base plate 61 is a support that is removably attached to the vehicle body BD. The steering knuckle 521 is a carrier that rotatably holds the front tire-wheel assembly 11. The steering knuckle 521 of the present embodiment also serves as the housing for the in-wheel motor unit.

The lower arm 62 is an arm member rotatably supported by the base plate 61 at one end (proximal end) and supported on a lower part of the steering knuckle 521 at the other end (distal end). The lower arm 62 is shaped such that the one end is divided into two parts, in other words, two arms are joined at the other end (for example, a V-shape). The one end of the lower arm 62 is coupled to two brackets 61a juxtaposed in the fore-and-aft direction at the lower end of the base plate 61.

The upper arm 63 is an arm member rotatably supported by the base plate 61 at one end (proximal end) and supported on an upper part of the steering knuckle 521 at the other end (distal end). Similarly to the lower arm 62, the upper arm 63 is shaped such that the one end is divided into two parts, in other words, two arms are joined at the other end (for example, a V-shape). The one end of the upper arm 63 is coupled to two brackets 61b juxtaposed in the fore-and-aft direction at the upper end of the base plate 61.

The other end of the lower arm 62 is coupled to the steering knuckle 521 via a ball joint 64 (that may be a tripod constant velocity joint). The other end of the upper arm 63 is coupled to the steering knuckle 521 via a ball joint 65. The steering knuckle 521 is rotatable about a kingpin axis KL defined by the ball joints 64 and 65. The kingpin axis KL is, for example, a straight line passing through a center 64a of the connection portion between the ball joint 64 and the steering knuckle 521 and a center 65a of the connection portion between the ball joint 65 and the steering knuckle 521. The spring absorber assembly 66 is rotatably supported by the base plate 61 at the upper end and is coupled to the lower arm 62 at the lower end.

As illustrated in FIG. 3, when the kingpin axis KL and the vertical line VL are projected onto a plane perpendicular to the tire-wheel assembly axis WL (may hereinafter be referred to as "XZ plane"), an angle between the kingpin axis KL and the vertical line VL in the XZ plane is a caster angle θ1. The kingpin axis KL is inclined so that the lower part is located on a forward side of the upper part.

Figure 4:
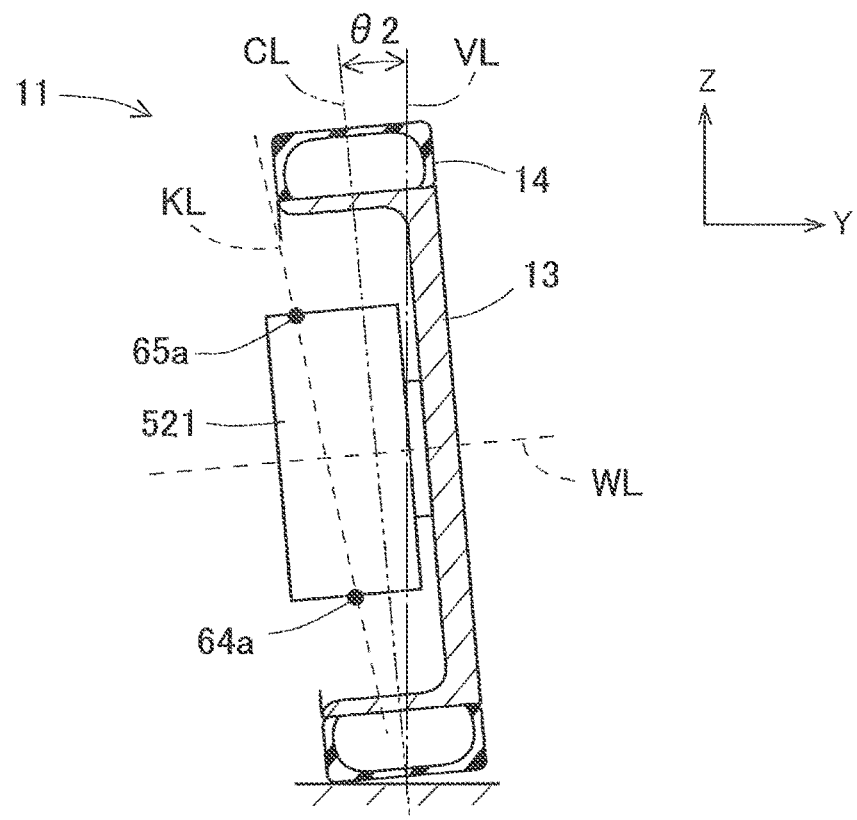
FIG. 4 is a schematic diagram illustrating a camber angle in the structure of the present embodiment.

As illustrated in FIG. 2, when the kingpin axis KL and the vertical line VL are projected onto a plane parallel to the tire-wheel assembly axis WL and perpendicular to a road surface (may hereinafter be referred to as "YZ plane"), an angle between the kingpin axis KL and the vertical line VL in the YZ plane is a kingpin angle θk. As illustrated in FIG. 4, an angle between a center line CL of the tire 14 and the vertical line VL in the YZ plane is a camber angle θ2. The center line CL of the tire 14 is a straight line orthogonal to the tire-wheel assembly axis WL and passing through the center of the tire 14 in its width direction. As illustrated in FIG. 3, a distance between the contact patch center SC and an intersection of the ground surface and the kingpin axis KL in the XZ plane is a caster trail CT.

Figure 5:
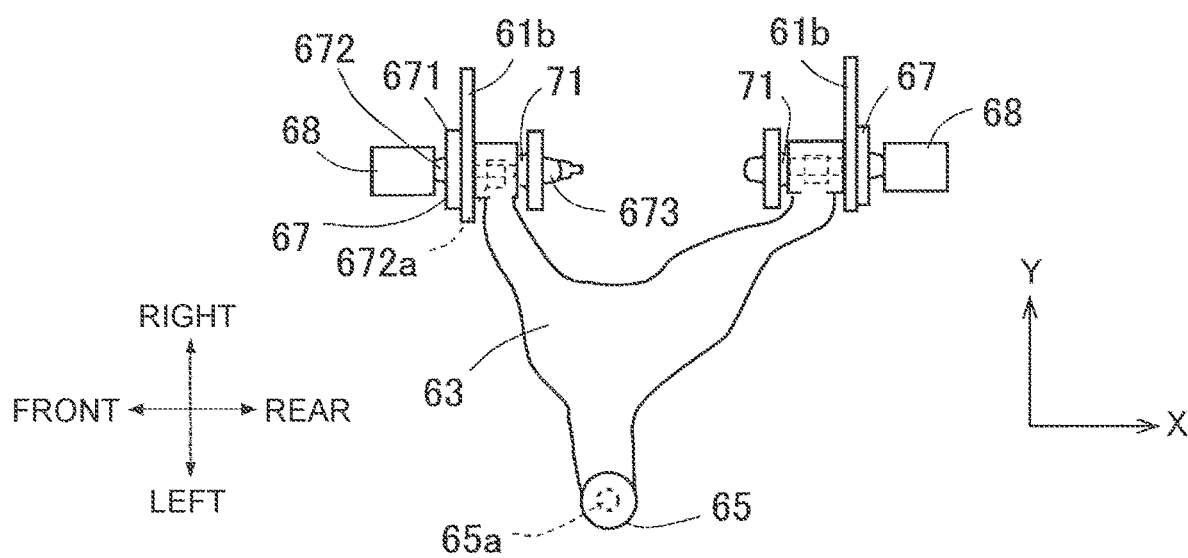
FIG. 5 is a schematic diagram illustrating an upper arm in the present embodiment as viewed from the top of the vehicle.

As illustrated in FIG. 5, an adjustment cam 67 is inserted through each part of the one end of the upper arm 63 via a tubular bush 71 as a coupling member to the bracket 61b. A through hole extending in the fore-and-aft direction is formed at each part of the one end of the upper arm 63. The bush 71 is arranged in the through hole of the upper arm 63, and the adjustment cam 67 is arranged inside the bush 71.

For example, when only the vehicle body BD is going to move forward while the front tire-wheel assembly 11 is stopped, the base plate 61 (bracket 61*b*) receives a forward force from the vehicle body BD and pushes each part of the one end of the upper arm 63 forward. The bush 71 is elastically deformed (crushed) by the pushing force from the upper arm 63, and the fore-and-aft width of the bush 71 decreases. As a result, the upper arm 63 and the center 65*a* of the ball joint 65 move slightly forward relative to the stopped front tire-wheel assembly 11. When the forward force is applied to the vehicle body BD while a resistive force (for example, a braking force or a backward driving force) is applied to the front tire-wheel assembly 11, the upper arm 63 is more susceptible to the force than the lower arm 62 near the road surface due to the moment. In the above situation, it is therefore likely that the bush 71 of the upper arm 63 is elastically deformed.

Figure 6:
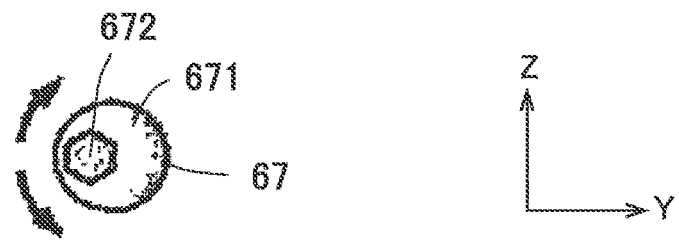
FIG. 6 is a schematic diagram illustrating an adjustment cam in the present embodiment as viewed from the front of the vehicle.

As illustrated in FIGS. 5 and 6, the adjustment cam 67 includes, for example, a graduated cam plate 671, a cam bolt 672, and a nut 673. The head of the cam bolt 672 is arranged on a front surface side of the cam plate 671. An eccentric cam portion 672*a* thicker than the other portions is formed on a rod portion of the cam bolt 672. When the cam bolt 672 rotates, the eccentric cam portion 672*a* rotates and the position of the upper arm 63 is changed such that the upper arm 63 is pushed by a portion projected due to the eccentricity. Since the mechanism of the adjustment cam 67 is well known, its detailed description will be omitted. An output shaft of an electric motor 68 is coupled to the head of the cam bolt 672, for example, via a speed reducing mechanism. Although illustration is omitted, the electric motor 68 is fixed to the vehicle body BD so that a motor housing is not rotatable relative to the vehicle body BD and is movable in the fore-and-aft direction. When the output shaft of the electric motor 68 rotates, the adjustment cam 67 rotates and the position of the upper arm 63 in the lateral direction is changed.

The control device 4 is an electronic control unit including a CPU, a memory, and the like, and is communicably connected to various devices via the CAN. For example, the control device 4 is communicably connected to the drive ECU 22, the brake ECU 34, the steering ECU 53, the electric motor 68, and various sensors. The control device 4 is configured to control the driving force to be applied by the driving force applying device 2 by instructing the drive ECU 22, and to control the braking force to be applied by the braking force applying device 3 by instructing the brake ECU 34.

The control device 4 acquires information on the vehicle speed from, for example, the drive ECU 22, information on the steering from, for example, the steering ECU 53, and information on the braking from, for example, the brake ECU 34. Examples of the information on the vehicle speed include a tire-wheel assembly speed, a vehicle speed, and an acceleration/deceleration request (requested acceleration or target acceleration). Examples of the information on the steering include an operation angle of the steering wheel 511 and a steering request (target steered angle). Examples of the information on the braking include a braking request (requested deceleration, target deceleration, or target braking force). For example, in the autonomous driving or various types of specific control, the acceleration/deceleration request, the braking request, and the steering request are output to the CAN without the driver's operation. The control device of the vehicle control system 1 may include the control device 4, the drive ECU 22, and the brake ECU 34.

Caster Angle Change Control

The control device 4 executes caster angle change control for controlling the driving force applying device 2 or each of the driving force applying device 2 and the braking force applying device 3 to reduce the caster angle of each front tire-wheel assembly 11 serving as the steered tire-wheel assembly when a steering request is received in a stopped state in which the vehicle is stopped or in a creeping state in which the vehicle is traveling in a preset direction out of a forward direction and a rearward direction without exceeding a predetermined vehicle speed at a point starting from the stopped state.

In the caster angle change control, the control device 4 applies, to one of the front tire-wheel assembly 11 and the rear tire-wheel assembly 12, a driving force in a direction toward the other of the front tire-wheel assembly 11 and the rear tire-wheel assembly 12 and applies, to the other of the front tire-wheel assembly 11 and the rear tire-wheel assembly 12, a braking force or a driving force in a direction toward the one of the front tire-wheel assembly 11 and the rear tire-wheel assembly 12 to achieve the stopped state or the creeping state in response to a request for acceleration or deceleration. The control device 4 determines, for example, whether the vehicle is in the stopped state and whether the vehicle is in the creeping state based on acquired vehicle speed information.

The execution timing of the caster angle change control is set assuming a parking operation for parking the vehicle in a parking lot or the like. The predetermined vehicle speed is set to, for example, 10 km/h or lower. In the determination about the creeping state, the determination as to whether the vehicle speed exceeds the predetermined vehicle speed is reset in the stopped state (state in which the vehicle speed is 0). That is, determination is not made that the vehicle is in the creeping state when the vehicle speed exceeds the predetermined vehicle speed and then the vehicle decelerates to the predetermined vehicle speed or lower. The creeping state may be a state in which the vehicle starts from the stopped state in the preset direction out of the forward direction and the rearward direction and keeps the predetermined speed or lower.

Effects of Caster Angle Change Control

According to the caster angle change control, the driving force in the direction toward the other tire-wheel assembly is applied to the one tire-wheel assembly, and the resistive force (braking force or the driving force toward the one tire-wheel assembly) is applied to the other tire-wheel assembly. Therefore, a force (moment) such as an inertial force generated in deceleration during forward movement is applied to the vehicle body BD. In other words, a force such as a pitching moment in a forward rotation direction is applied to the vehicle body BD by the caster angle change control. When such a force is applied to the vehicle body BD, a forward force is structurally applied to the upper parts (upper arm 63 and ball joint 65 in this example) defining the upper passing point 65*a* of the kingpin axis KL, and the elastic member arranged on the upper parts (bush 71 in this example) is elastically deformed. Through the elastic deformation, the upper arm 63 and the upper passing point 65*a* of the kingpin axis KL move forward relative to the lower passing point 64*a* of the kingpin axis KL.

According to the present embodiment described above, the upper part (upper arm 63) is moved forward relative to the steered tire-wheel assembly (front tire-wheel assembly 11) by elastically deforming the elastic member mounted on the vehicle as intended to raise the kingpin axis KL in the XZ plane, thereby reducing the caster angle θ1. The bush 71 is elastically deformed by the force received by the vehicle body BD and the upper arm 63, and the upper arm 63 moves forward relative to the front tire-wheel assembly 11 by the amount corresponding to the deformation. Through the elastic deformation of the bush 71, the relative position of the center 65a on the upper arm 63 side to the center 64a on the lower arm 62 side moves forward, thereby reducing the caster angle θ1.

As the caster angle θ1 decreases, a restoration torque for the steering of the front tire-wheel assembly 11 decreases during traveling. When the caster angle θ1 decreases in the stopped state, the caster trail CT decreases and the resistance to the steering operation for the front tire-wheel assembly 11 decreases. That is, the force required to steer the front tire-wheel assembly 11 in the stopped state or the creeping state is reduced because the caster angle θ1 is reduced by the caster angle change control. According to the present embodiment, it is possible to reduce the force required in the steering for the change of the steered angle of the steered tire-wheel assembly in the stopped state or the creeping state.

According to the present embodiment, it is possible to reduce a load (required torque) on the steering motor 522b in the stopped state or the creeping state in which a large load is likely to occur. Therefore, it is possible to downsize the steering motor 522b. In the steer-by-wire steering system 5, the driver's operating force is not applied to the steered tire-wheel assembly, and the steering motor 522b bears almost all of the required torque. Therefore, the reduction of the required torque by the caster angle change control is particularly effective.

The control device 4 may be set to terminate the caster angle change control under execution, for example, when the vehicle speed exceeds the predetermined vehicle speed or when there is no steering request (for example, when the actual steered angle reaches the target steered angle). The caster angle change control will be described below in more detail. The control device 4 can selectively execute first caster angle change control, second caster angle change control, or third caster angle change control.

First Caster Angle Change Control

The first caster angle change control can be executed by a vehicle configured such that the driving force applying device 2 can apply a driving force to the rear tire-wheel assemblies 12, that is, a rear-wheel drive vehicle or a four-wheel drive vehicle. In the first caster angle change control, the creeping state is a state in which the vehicle is moving forward without exceeding the predetermined vehicle speed at a point starting from the stopped state (hereinafter referred to as "forward creeping state" as well).

Figure 7:
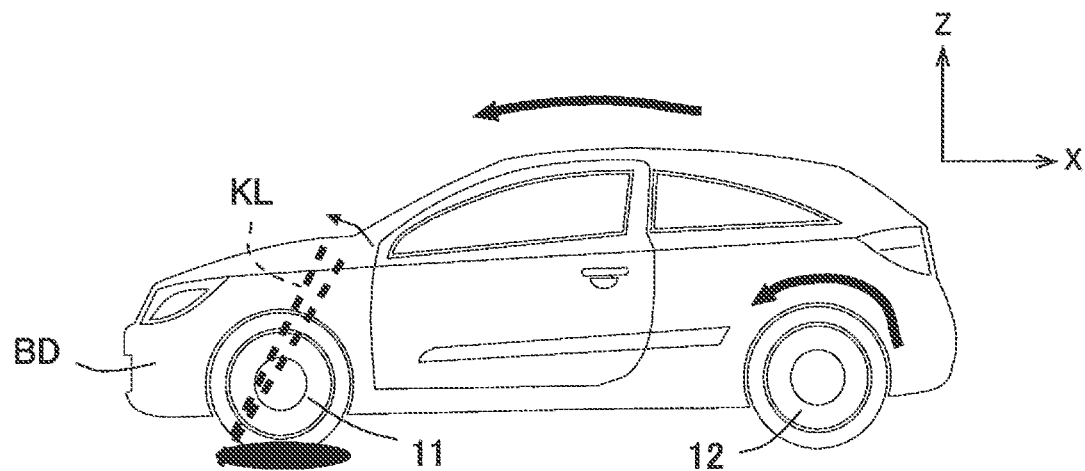
FIG. 7 is a schematic diagram illustrating first caster angle change control of the present embodiment.

When the control device 4 receives a steering request in the stopped state or the forward creeping state, the control device 4 applies a braking force to each front tire-wheel assembly 11 and a driving force in the forward direction to each rear tire-wheel assembly 12 as the first caster angle change control. According to the first caster angle change control in FIG. 7, the vehicle body BD is going to move forward by the driving force on the rear tire-wheel assembly 12, and the front tire-wheel assembly 11 is going to stop. Therefore, a moment in the forward rotation direction is applied to the vehicle body BD, and the bush 71 and the like on the upper arm 63 side are elastically deformed. As a result, the kingpin axis KL is raised and the caster angle θ1 decreases.

For example, when the vehicle is kept in the stopped state without an acceleration request, the control device 4 in the first caster angle change control applies, to the front tire-wheel assembly 11, a braking force capable of maintaining the stopped state even when the driving force on the rear tire-wheel assembly 12 is received. The driving force on the rear tire-wheel assembly 12 is set to, for example, a force for crushing the bush 71 (a force required to crush the bush 71).

For example, when the forward creeping state continues without an acceleration request, the control device 4 in the first caster angle change control sets the driving force on the rear tire-wheel assembly 12 and the braking force on the front tire-wheel assembly 11 to cause the vehicle to advance at a creeping speed with the driving force on the rear tire-wheel assembly 12 overcoming the braking force on the front tire-wheel assembly and to crush the bush 71. When the control device 4 receives an acceleration/deceleration request during execution of the first caster angle change control, the control device 4 changes the driving force in response to the request, and continues to execute the first caster angle change control as long as the execution condition (0≤vehicle speed≤predetermined speed) is satisfied.

Second Caster Angle Change Control

The second caster angle change control can be executed by a vehicle configured such that the driving force applying device 2 can apply a driving force to the front tire-wheel assemblies 11, that is, a front-wheel drive vehicle or a four-wheel drive vehicle. In the second caster angle change control, the creeping state is a state in which the vehicle is moving rearward without exceeding the predetermined vehicle speed at a point starting from the stopped state (hereinafter referred to as "rearward creeping state" as well).

Figure 8:
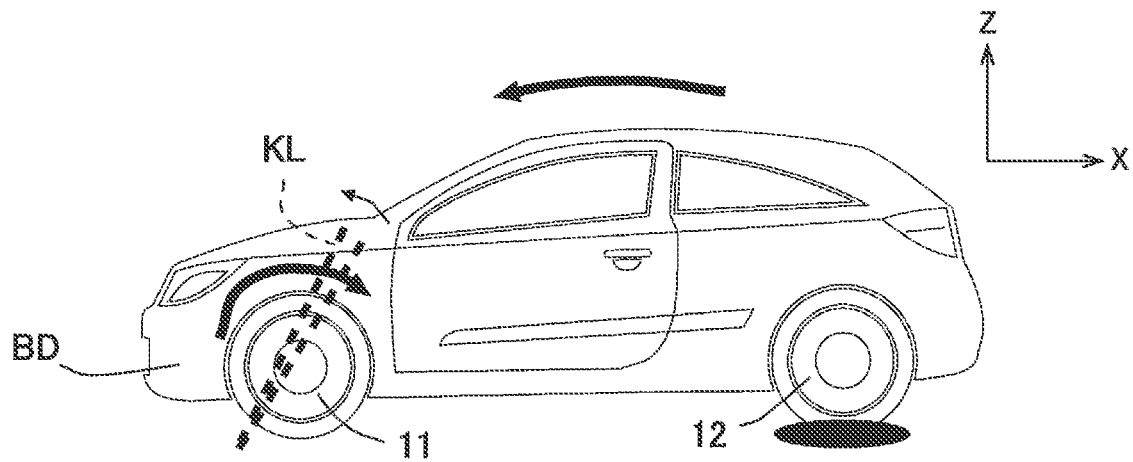
FIG. 8 is a schematic diagram illustrating second caster angle change control of the present embodiment.
Figure 9:
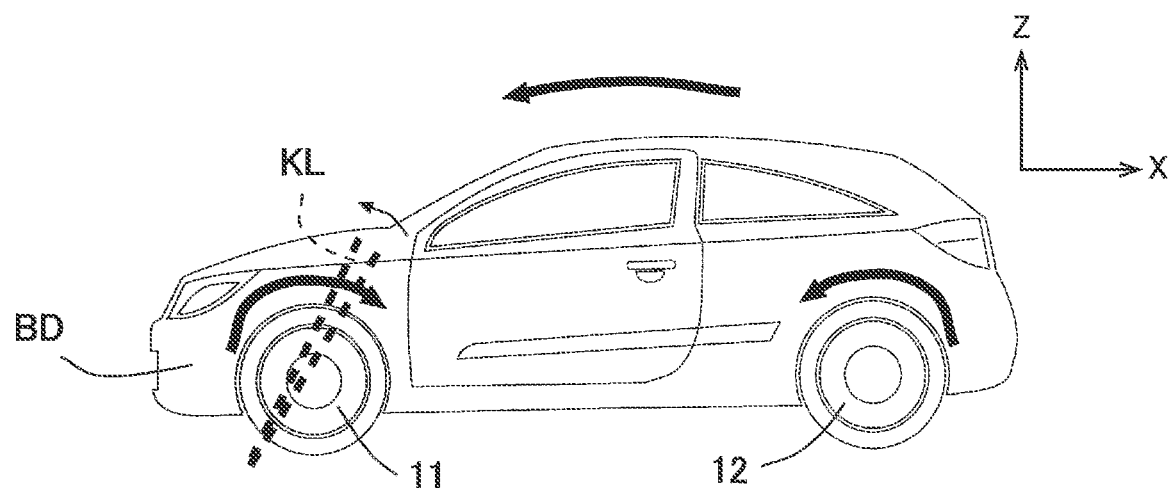
FIG. 9 is a schematic diagram illustrating third caster angle change control of the present embodiment.

When the control device 4 receives a steering request in the stopped state or the rearward creeping state, the control device 4 applies a driving force in the rearward direction to each front tire-wheel assembly 11 and a braking force to each rear tire-wheel assembly 12 as the second caster angle change control. According to the second caster angle change control in FIG. 8, the vehicle body BD is going to move rearward by the driving force on the front tire-wheel assembly 11, and the rear tire-wheel assembly 12 is going to stop. As a result, a moment in the forward rotation direction is generated in the vehicle body BD, and the bush 71 and the like on the upper arm 63 are elastically deformed. Thus, the kingpin axis KL is raised and the caster angle θ1 decreases. The same concept as in the first caster angle change control is applied to the setting of the driving force and the braking force in the second caster angle change control.

Third Caster Angle Change Control

The third caster angle change control can be executed by a vehicle configured such that the driving force applying device 2 can apply a driving force to the front tire-wheel assemblies 11 and the rear tire-wheel assemblies 12, that is, a four-wheel drive vehicle. When the control device 4 receives a steering request in the stopped state or the creeping state, the control device 4 applies a driving force in the rearward direction to each front tire-wheel assembly 11 and a driving force in the forward direction to each rear tire-wheel assembly 12 as the third caster angle change control.

When the control device 4 executes the third caster angle change control while keeping the stopped state, the control device 4 sets the braking force on one of the front tire-wheel assembly 11 and the rear tire-wheel assembly 12 to be equal to or larger than the driving force on the other of the front tire-wheel assembly 11 and the rear tire-wheel assembly 12 so that the vehicle does not start and the bush 71 is elastically deformed. When the control device 4 executes the third caster angle change control while keeping the forward creeping state, the control device 4 sets the driving force on the rear tire-wheel assembly 12 to be larger than the driving force on the front tire-wheel assembly 11 so that the vehicle moves forward at a creeping speed and the bush 71 is elastically deformed. When the control device 4 executes the third caster angle change control while keeping the rearward creeping state, the control device 4 sets the driving force on the front tire-wheel assembly 11 to be larger than the driving force on the rear tire-wheel assembly 12 so that the vehicle moves rearward at a creeping speed and the bush 71 is elastically deformed.

In the third caster angle change control, the driving forces are applied to the front tire-wheel assembly 11 and the rear tire-wheel assembly 12 in directions in which a separation distance between the front tire-wheel assembly 11 and the rear tire-wheel assembly 12 decreases. For example, in the third caster angle change control in the stopped state, the force for elastically deforming the bush 71 is applied to the vehicle body BD more easily than in the first caster angle change control and the second caster angle change control, thereby raising the kingpin axis KL (reducing the caster angle) more easily.

As described above, the creeping state in the third caster angle change control includes the forward creeping state and the rearward creeping state. In the vehicle capable of executing the first caster angle change control, the second caster angle change control, and the third caster angle change control as in the present embodiment, for example, the caster angle change control to be executed is preset for each of the stopped state, the forward creeping state, and the rearward creeping state. The control device 4 may be set to select any one of the first caster angle change control, the second caster angle change control, and the third caster angle change control depending on situations.

Camber Angle Change Control

The control device 4 is further configured execute camber angle change control. As described above, the vehicle control system 1 includes the adjustment cam 67 and the electric motor 68 in each front tire-wheel assembly 11 (steered tire-wheel assembly). The adjustment cam 67 is capable of changing the camber angle $\theta 2$ by rotation. The electric motor 68 rotates the adjustment cam 67. The adjustment cam 67 is an example of a camber angle adjusting mechanism, and the electric motor 68 is an example of a drive source. The control device 4 executes camber angle change control for adjusting the camber angle $\theta 2$ by controlling the electric motor 68 based on the vehicle speed. Through the rotation of the electric motor 68, the adjustment cam 67 rotates and the position of the upper arm 63 in the lateral direction is changed. Hereinafter, the camber angle $\theta 2$ will be described as an absolute value of the camber angle $\theta 2$.

For example, in the state of FIG. 4 (negative camber), when the center 65*a* of the connection of the upper arm 63 is moved toward the center of the vehicle body BD (leftward in FIG. 4) through the adjustment by the adjustment cam 67, the kingpin axis KL is inclined leftward and the center line CL of the tire 14 is also inclined leftward. As a result, the camber angle $\theta 2$ increases. When the center 65*a* is moved outward (rightward in FIG. 4) in the state of FIG. 4, the kingpin axis KL is inclined rightward and the center line CL is also inclined rightward. As a result, the camber angle $\theta 2$ decreases until the center line CL moves over the vertical line VL.

As the camber angle $\theta 2$ increases, the center line CL of the tire 14 is inclined more and the contact area between the tire 14 and the ground surface (for example, the road surface) decreases. As a result, the frictional force between the tire 14 and the ground surface decreases when changing the steered angle of the front tire-wheel assembly 11, thereby reducing the force required for the steering. For example, the control device 4 may be set to increase the camber angle $\theta 2$ when the vehicle speed is equal to or lower than the predetermined vehicle speed, and reduce the camber angle $\theta 2$ when the vehicle speed is higher than the predetermined vehicle speed. As a result, the camber angle $\theta 2$ can be increased at a low speed to reduce the force required for the steering, and can be returned to the initially set angle at a normal traveling speed to exhibit predetermined performance.

The control device 4 of the present embodiment increases the camber angle $\theta 2$ by executing the camber angle change control in response to the execution of the caster angle change control. That is, the control device 4 increases the camber angle $\theta 2$ in the situation in which the caster angle change control is executed. As a result, the force required for the steering is further reduced in the stopped state or the creeping state. For example, the control device 4 executes the camber angle change control after the execution of the caster angle change control. The execution timing of the camber angle change control may be prior to, subsequent to, or simultaneous with the execution of the caster angle change control. The camber angle change control can be executed both in a negative camber vehicle and in a positive camber vehicle. The caster angle change control and the camber angle change control are also referred to as "suspension geometry adjustment control".

A control example of the vehicle control system 1 is described taking the first caster angle change control as an example. As illustrated in FIG. 10, determination is made as to whether the vehicle is in the stopped state or the forward creeping state based on information from various sensors (S1). When the vehicle is in the stopped state or the forward creeping state (S1: Yes), determination is made as to whether there is a steering request (S2). When there is a steering request (S2: Yes), a braking force is applied to each front tire-wheel assembly 11 (S3). Subsequently, a driving force in the forward direction is applied to each rear tire-wheel assembly 12 (S4). The first caster angle change control is executed in Steps S3 and S4 to reduce the caster angle $\theta 1$. Subsequently, the camber angle change control is executed (S5) to increase the camber angle $\theta 2$. According to the present embodiment described above, the caster angle $\theta 1$ decreases and the camber angle $\theta 2$ increases in the stopped state or the forward creeping state, thereby further reducing the force required for the steering.

When the vehicle speed exceeds the predetermined vehicle speed, the caster angle change control is terminated, and a normal driving force is applied in response to an acceleration/deceleration request. When the vehicle speed exceeds the predetermined vehicle speed after the camber angle $\theta 2$ is increased by the camber angle change control, the control device 4 reduces the camber angle $\theta 2$ by the camber angle change control (for example, to the initial value).

When the second caster angle change control is executed instead of the first caster angle change control, determination is made in Step S1 as to whether the vehicle is in the stopped state or the rearward creeping state, a braking force is applied to the rear tire-wheel assembly 12 in Step S3, and a driving force in the rearward direction is applied to the front tire-wheel assembly 11 in Step S4. When the third caster angle change control is executed instead of the first caster angle change control, determination is made in Step S1 as to whether the vehicle is in the stopped state or the creeping state, no braking force is applied in Step S3, and a driving force in the rearward direction is applied to the front tire-wheel assembly 11 and a driving force in the forward direction is applied to the rear tire-wheel assembly 12 simultaneously in Step S4.

Steering Assist Control

As the control to reduce the force required for the steering (load on the steering motor 522b), the control device 4 may execute steering assist control in addition to the caster angle change control and the camber angle change control to apply different driving forces to the right and left tire-wheel assemblies. To cause the vehicle to travel forward and make a turn, the control device 4 may, for example, apply a driving force in the forward direction to the outer tire-wheel assemblies during the turn and a driving force in the rearward direction to the inner tire-wheel assemblies during the turn as the steering assist control. As a result, a yaw moment is generated in a desired turning direction, thereby reducing the force required for the steering. In the steering assist control, the control device 4 may apply, to the inner tire-wheel assemblies during the turn, a driving force (including zero) in the forward direction smaller than the driving force on the outer tire-wheel assemblies during the turn, or may apply a braking force to the inner tire-wheel assemblies during the turn. This also makes it possible to generate the yaw moment in the desired turning direction. Based on the same principle as that in the forward movement, the steering assist control can be executed even in the rearward movement.

Others

An applicable embodiment of the present disclosure is not limited to the embodiment described above. For example, the drive source of the driving force applying device 2 is not limited to the in-wheel motor 21, and may be, for example, an engine or a motor arranged in the vehicle body BD. The present disclosure is applicable to, for example, any of a gasoline vehicle, a hybrid electric vehicle, a battery electric vehicle, and a fuel cell electric vehicle. When the vehicle is a rear-wheel drive vehicle, the first caster angle change control can be applied. When the vehicle is a front-wheel drive vehicle, the second caster angle change control can be applied. The present disclosure can also be applied to an autonomous driving vehicle.

The braking force applying device 3 may be, for example, an electric parking brake. The steering system 5 is not limited to the steer-by-wire steering system, and may be, for example, a power steering system. Even in the case of the vehicle including the power steering system, the force required to change the steered angle by the caster angle change control decreases, thereby reducing the steering assist force or the driver's operating force. The portion to be elastically deformed is not limited to the bush 71, and may be another elastic member such as a bush provided on any type of rod.

The control device 4 may be set to execute the caster angle change control only in the stopped state. In this case, the caster angle change control is terminated and the urging force and the inertial force applied to the vehicle body BD are lost when the vehicle starts from the stopped state. However, it takes some time for the caster angle θ1 to return to the initial state because the crushed bush 71 is gradually restored. Therefore, the effect of the caster angle change control continues for a while after the start. The state of force may change not only when the caster angle change control is terminated but also when the vehicle starts during the execution of the caster angle change control. In this case as well, the effect of the caster angle change control continues to some extent because the caster angle θ1 gradually returns. The control device 4 may be set to execute the caster angle change control only in the creeping state. The control device 4 may be configured to execute the caster angle change control and not to execute the camber angle change control.

The suspension device 6 is not limited to the double wishbone suspension device, and may be, for example, a strut suspension device. In this case, for example, the center of an upper support that supports the upper end of a shock absorber on the vehicle body is the upper passing point of the kingpin axis KL, and corresponds to the center 65a of the connection of the upper arm 63 in the present embodiment. In this structure as well, elastic members are used in individual parts. Therefore, it is possible to raise the kingpin axis KL by the caster angle change control. Even in the strut type, the camber angle change control can be executed, for example, by adjusting the position of a lower arm. Even in the strut type, the adjustment cam may be adopted, for example, as a strut bolt and the camber angle change control may be executed to adjust the camber angle with the electric motor as in the embodiment. The camber angle adjusting mechanism may include, for example, a nut fixed to one end of the upper arm 63 and a bolt threadedly engaged with the nut. The positions of the nut and the upper arm 63 in the lateral direction can be adjusted by rotating the bolt with the driving force of the electric motor as in the embodiment. The connection structure between the upper arm 63 and the base plate 61 is not limited to the adjustment cam 67, and may be a structure using a bolt and a nut. Even in such a structure, an elastic member (for example, a bush) is arranged at the connection portion. As described above, the present disclosure can be carried out in various forms with various modifications and improvements based on the knowledge of those skilled in the art in addition to the embodiment described above.

What is claimed is:

1. A vehicle control system comprising:
   a driving force applying device configured to apply a driving force to at least one of a front tire-wheel assembly and a rear tire-wheel assembly;
   a braking force applying device configured to apply a braking force to each of the front tire-wheel assembly and the rear tire-wheel assembly; and
   a control device configured to control the driving force to be applied by the driving force applying device and the braking force to be applied by the braking force applying device,
   wherein the control device is configured to execute caster angle change control for controlling the driving force applying device or each of the driving force applying device and the braking force applying device to reduce a caster angle of a steered tire-wheel assembly when a steering request is received in a stopped state in which a vehicle is stopped or in a creeping state in which the vehicle is traveling in a preset direction out of a forward direction and a rearward direction without exceeding a predetermined vehicle speed at a point starting from the stopped state, and
   wherein the control device is configured to, in the caster angle change control, apply, to one of the front tire-wheel assembly and the rear tire-wheel assembly, a driving force in a direction toward the other of the front tire-wheel assembly and the rear tire-wheel assembly and apply, to the other of the front tire-wheel assembly and the rear tire-wheel assembly, the braking force or a driving force in a direction toward the one of the front tire-wheel assembly and the rear tire-wheel assembly to achieve the stopped state or the creeping state in response to a request for acceleration or deceleration.

2. The vehicle control system according to claim 1,
wherein the driving force applying device is configured to apply the driving force to the rear tire-wheel assembly,
wherein the creeping state is a state in which the vehicle is moving forward without exceeding the predetermined vehicle speed at the point starting from the stopped state, and
wherein the control device is configured to apply the braking force to the front tire-wheel assembly and a driving force in the forward direction to the rear tire-wheel assembly as the caster angle change control when the steering request is received in the stopped state or the creeping state.

3. The vehicle control system according to claim 1,
wherein the driving force applying device is configured to apply the driving force to the front tire-wheel assembly,
wherein the creeping state is a state in which the vehicle is moving rearward without exceeding the predetermined vehicle speed at the point starting from the stopped state, and
wherein the control device is configured to apply a driving force in the rearward direction to the front tire-wheel assembly and the braking force to the rear tire-wheel assembly as the caster angle change control when the steering request is received in the stopped state or the creeping state.

4. The vehicle control system according to claim 1,
wherein the driving force applying device is configured to apply the driving force to each of the front tire-wheel assembly and the rear tire-wheel assembly, and
wherein the control device is configured to apply a driving force in the rearward direction to the front tire-wheel assembly and a driving force in the forward direction to the rear tire-wheel assembly as the caster angle change control when the steering request is received in the stopped state or the creeping state.

5. The vehicle control system according to claim 1, further comprising a steer-by-wire steering system.

6. The vehicle control system according to claim 1, further comprising:
a camber angle adjusting mechanism provided to the steered tire-wheel assembly and configured to adjust a camber angle; and
a drive source configured to actuate the camber angle adjusting mechanism,
wherein the control device is configured to adjust the camber angle by controlling the drive source based on a vehicle speed.

7. The vehicle control system according to claim 6, wherein the control device is configured to increase the camber angle by controlling the drive source in response to execution of the caster angle change control.

* * * * *